United States Patent [19]

Lankard

[11] Patent Number: 4,513,040
[45] Date of Patent: Apr. 23, 1985

[54] HIGHLY WEAR-RESISTANT STEEL FIBER REINFORCED CONCRETE TILES

[75] Inventor: David R. Lankard, Columbus, Ohio

[73] Assignee: Ribbon Technology, Inc., Gahanna, Ohio

[21] Appl. No.: 488,241

[22] Filed: Apr. 22, 1983

[51] Int. Cl.³ .............................................. B32B 13/02
[52] U.S. Cl. ........................................ 428/49; 52/612; 106/97; 106/99; 428/323
[58] Field of Search ............... 106/99, 97; 428/47, 428/49, 323, 329, 703; 52/612

[56] References Cited

U.S. PATENT DOCUMENTS

| | | | |
|---|---|---|---|
| 1,559,146 | 10/1925 | Andrews | 106/99 X |
| 3,671,368 | 6/1972 | Shelley | 428/49 |
| 3,808,085 | 4/1974 | Givens, Jr. | 428/213 X |
| 3,846,085 | 11/1974 | Dunn, Jr. | 428/542.2 X |
| 3,986,885 | 10/1976 | Lankard | 106/99 |
| 4,314,853 | 2/1982 | Moens | 428/369 X |
| 4,339,289 | 7/1982 | Lankard | 428/703 X |
| 4,366,255 | 12/1982 | Lankard | 428/703 X |

*Primary Examiner*—Henry F. Epstein
*Attorney, Agent, or Firm*—Biebel, French & Nauman

[57] ABSTRACT

A heavy duty, wear, crack and spall-resistant concrete composite floor tile comprising: a concrete substrate layer containing 4 to 16 volume percent of dispersed, fine metal fibers and, a wear-resistant concrete surface layer containing about 30 to 60 volume percent of wear-resistant, metallic or inorganic aggregate, or 4 to 16 volume percent fine metal fibers, said tile being further characterized in that the layers are bonded to each other by a plurality of metal fibers having one end embedded in and bonded to the substrate layer and the other end embedded in and bonded to the surface layer, and when said surface layer contains said metal fibers, said fibers are present therein in an amount greater than the amount of said fibers in said substrate layer.

18 Claims, 5 Drawing Figures

HIGHLY WEAR-RESISTANT STEEL FIBER REINFORCED CONCRETE TILES

BACKGROUND OF THE INVENTION

The movement of tracked vehicles (such as caterpillar tractors, army tanks and mining equipment) over industrial floors can result in distress of the floors in the form of cracking, spalling and a high wear rate. Traditional remedies to this problem have not been entirely satisfactory. For example, one approach has been to use iron aggregate topping materials as the wearing surface in industrial floor slabs. This concept does provide improvements in wear resistance relative to conventional portland cement concrete floors. However, even with this topping material incorporated, the floor slab is still relatively brittle and can crack and spall under severe loading conditions. Thus, there is a need in the art for industrial floors exhibiting improved resistance to cracking, spalling and wear, especially under conditions of high point loads.

SUMMARY OF THE INVENTION

This invention relates to the development of cement-based floor tiles that have shown superior performance when used under loading conditions known to cause severe wear and/or cracking in other types of tiles. This effect is achieved by incorportating large percentages of metal reinforcing fibers into floor tile composites containing a wear-resistant surfacing material.

A principal object of the invention is to provide an industrial floor that not only is resistant to wear, but also eliminates the cracking and spalling problem.

Another object of the invention is to provide industrial flooring of improved performance in the form of tiles that can be readily shipped and assembled at the site of use.

A further object of the present invention is to provide a method for manufacturing such highly wear-resistant concrete tiles.

These and other objects are attained in accordance with the present invention as heavy duty, wear-resistant concrete floor tiles in the form of precast concrete composites.

The immediate wearing surface of the composite tile (to a depth of ¼ to 1 inch) is a concrete material containing a high percentage of metal reinforcing fibers (4 to 16 volume percent) and typically containing a high percentage (30 to 60 volume percent) of wear-resistant aggregate.

The wearing surface layer is backed up by a steel fiber reinforced concrete layer (1 to 4 inch thick) containing a high percentage of steel fibers (4 to 16 volume percent). The wearing surface layer and the back-up layer are firmly bonded together by the steel fibers common to each layer. When the wearing surface contains metal fibers as the wear-resistant additive, the substrate layer will contain a lesser amount of fibers than the wearing surface.

In practice, improved wear resistance is provided by the wearing surface layer while the overall integrity of the composite (crack and spall resistance) is afforded by the heavy fiber reinforcement in the back-up layer which carries into the wearing surface layer.

DETAILED DESCRIPTION OF THE PREFERRED EMBODIMENT

Figure 1:
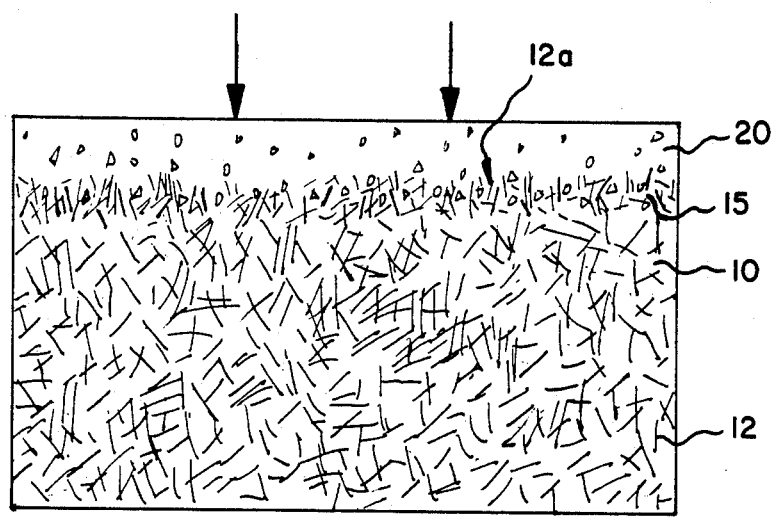

FIG. 1 shows a section view of the concrete composite floor tile which is the present invention. As seen in FIG. 1, the invention contains two distinct concrete layers. The thicker layer 10 is the substrate of the tile and contains a mass of fine metal fibers 12. The surface layer 20 is the wear-resistant surface of the tile and is depicted as thinner than the substrate layer 10. Certain of the metal fibers designated as 12a pass through the boundry 15 between the two layers and have one of their ends embedded in and bonded to the substrate layer 10 and have their other end embedded in and bonded to the surface layer 20.

Typically, the surface layer is a wear-resistant concrete having at least about 30 to 60 volume percent of a wear-resistant aggregate uniformly dispersed therein which prevents the concrete from completely pulverizing under the force of a high point load. The aggregates used typically have a maximum particle size of about 4 mesh (0.187 inch).

The aggregate included in the surface layer will be one or both of two principal types. The first type is a malleable metal aggregate, with iron being the principal embodiment of interest but copper, brass, aluminum and lead aggregate also being potentially useful. Iron aggregate of this type is known in the art and is commercially available for use in certain specialty concretes. The second type of aggregate that can be used is a hard mineral aggregate preferably having a Mohs Hardness value greater than 7. Suitable mineral aggregates include inorganic oxides such as aluminum oxide. Emery, fused alumina and trap rock are also useful.

While the surface layer 20 is shown in FIG. 1 as not containing fibers other than the bridging fibers 12a, in other embodiments of the invention the surface layer may also include substantial volumes of metal reinforcing fibers in amounts equaling, or exceeding, the amount of fiber in the substrate layer. Fibers in the surface layer may be "soft" metals such as copper or aluminum, which make the wearing surface malleable so that it deforms rather than pulverizes under heavy point loads.

The substrate layer is a cured concrete reinforced with metal fibers. The metal fibers preferably are carbon steel. The metal fibers may have diameters in the range of about 0.010 to 0.050 inch and have lengths in the range of about 0.75 to 3.0 inch. The metal fibers preferably also have a controlled ratio of length to diameter of at least about 50; this ratio in the art being referred to as the aspect ratio. The substrate layer contains at least 4 volume percent and preferably 8 to 16 volume percent of the metal fibers.

The surface layer is normally thinner in cross-section than the substrate layer, but is sufficiently thick to prevent spalling. As a general rule, surface layers in the range of about 0.25 to 1.0 inch are adequate. The substrate layer is typically about 1 to 4 inch thick.

Figure 2:
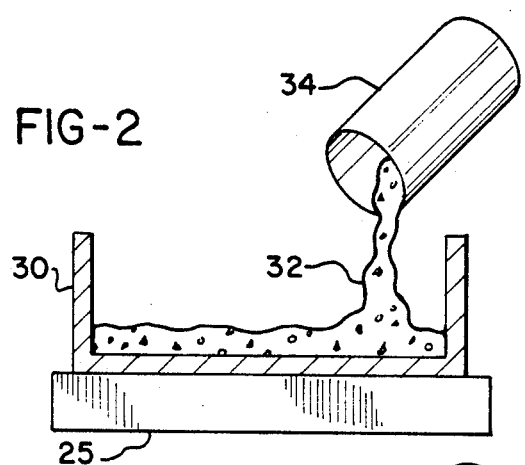
Figure 3:
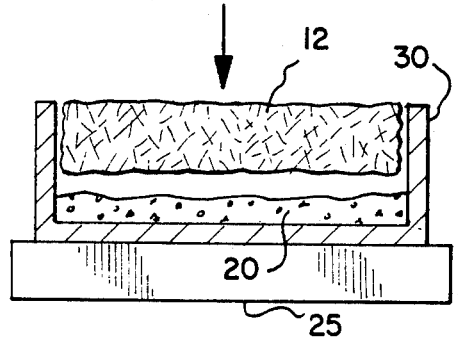
Figure 4:
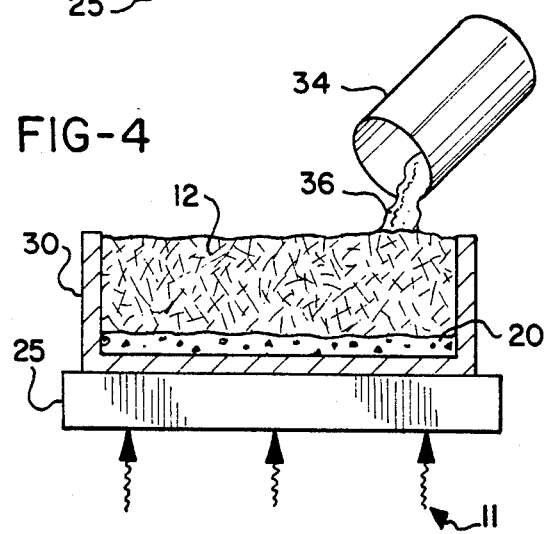
Figure 5:
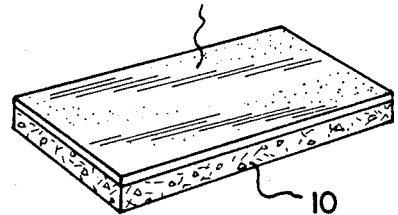

The method for preparing the tiles of the invention is illustrated by FIGS. 2, 3, and 4. A tile mold 30 of any desired size is placed on a vibratory surface 25. Concrete 32, which will constitute the surface layer 20 of the tile, is poured from a container 34 into the mold 30. The quantity of concrete 32 employed will be sufficient to form a layer ¼ to 1.0 inch in depth. The concrete 32 will be formulated to retain its fluid-like consistency for a period of about 0.5 to 1.0 hour. Referring to FIG. 3, the quantity of metal fibers desired in the substrate layer is placed in mold 32 to fill the remaining free space of mold 30. The fibers can be placed in the mold 30 in the form of a preformed mat or as loose fibers. Under the effect of the vibratory surface 25, the fibers penetrate into the preplaced surface layer 32 (which is still in a fluid state).

As shown in FIG. 4, in the next step of the process, a slurry 36 of the concrete, which will constitute the subsurface layer of the tile, is poured from a container 34 onto the bed of fibers 12. The maximum particle size of the concrete 36 used for infiltrating the fiber bed 12 must be less than the minimum spacing between the fibers. Typically, particle sizes up to 30 mesh (0.023 inch) are useful. During infiltrating of the concrete slurry, the table 25 is continuously vibrated at a low amplitude.

The cement binder in the concrete slurry is preferably portland cement, but could also be calcium aluminate cement, magnesium phosphate cement, other inorganic cements, or a polymer cement. With portland cement and calcium aluminate cement it is preferable to formulate the concrete slurry with a superplasticizer to facilitate infiltration of the fibers. Sulfonated melamine formaldehyde and sulfonated naphthalene formaldehyde are two examples of superplasticizers useful in the present invention. They are generally used in an amount of 15 to 70 ounces per hundred weight of cement.

Following the infiltration step, the cement-based composite is left to harden in the mold. After a 24 hour period (typically), the tile is removed from the mold, at which point it may be subjected to an additional curing period.

The following examples are set forth to illustrate more clearly the principle and practice of this invention to those skilled in the art.

EXAMPLE 1

Several tiles were prepared as follows:

A mold, having dimensions 2'×2'×2.5", was placed on a vibratory table. The mold was filled to a depth of 0.5 inch with an aqueous slurry of a proprietary material known as "Anvil-Top" (a product of Master Builders Corporation, Cleveland, Ohio containing portland cement and iron aggregates). The remaining depth of the mold was then immediately filled with a bed of Xorex steel fibers (Ribbon Technology Corporation, Gahanna, Ohio) in an amount to constituted 13 volume percent of the free space of the mold. The steel fibers had diameters of about 0.030 inch and were approximately 2 inch long. The fiber bed was vibrated so that a portion of the steel fibers were embedded into the Anvil-Top slurry. While vibrating, the mold was filled with a second concrete slurry having the composition set forth below:

| Component | Weight Percent |
|---|---|
| Portland Cement | 64 |
| Fly Ash | 16 |
| Water | 20 |

After setting for approximately 24 hours, the finished tile was removed from the mold.

EXAMPLE 2

Example 1 was repeated except that the concrete used to prepare the surface layer had the following composition:

| Component | Weight Percent |
|---|---|
| Portland Cement | 27 |
| Silica Sand | 12 |
| Fused Alumina Aggregate* | 54 |
| Water | 7 |

*Mesh size −6 +14

The slurry contained about 40 volume percent of the alumina aggregate.

EXAMPLE 3

Example 1 was repeated except that the surface layer was formed by first filling the mold to a depth of 0.75 inch with 0.020 inch diameter by 0.75 inch long steel fibers to provide a loading of about 16 volume percent ( in the space occupied). This fiber bed was then infiltrated with the following composition:

| Component | Weight Percent |
|---|---|
| Portland Cement | 59 |
| Silica Sand | 26 |
| Water | 15 |

Thereafter, the remaining depth of the mold was filled with Xorex steel fibers as in Example 1 and these fibers were infiltrated with the same composition as above while vibrating the mold.

EXAMPLE 4

Wear tests were carried out on floor sections prepared from tiles prepared in accordance with Examples 1, 2, and 3 above. As a control, another floor section was prepared from commercial polymer concrete floor tiles having an Anvil-top wearing surface.

The tests were conducted by running a tracked coal mining machine over each of the experimental floors. The tests involved both direct runs over the tiles as well as turns carried out thereon. An equal number of runs and turns were made on each of the experimental floors with the number of runs being equivalent to about one year of normal traffic.

Inspections of the floors, made with the experimental tiles of the invention, showed no cracks or spalls in any of the tiles of the invention. Minor scoring and gouging of the surface layers of the tiles were noted, but the level of wear was deemed acceptable and of little significance. By contrast, all of the commercial tiles were badly cracked and spalled following the test.

While the method herein described, and the product thereof, constitute preferred embodiments of this invention, it is to be understood that the invention is not limited to this precisee method and product, and that changes may be made in either without departing from the scope of the invention, which is defined in the appended claims.

What is claimed is:

1. A heavy duty, wear, crack and spall-resistant concrete composite floor tile comprising:
   a concrete substrate layer containing 4 to 16 volume percent of dispersed, fine, metal fibers, and a wear-resistant concrete surface layer containing about 30 to 60 volume percent of wear-resistant, metallic aggregate or an inorganic aggregate having a Mohs hardness of at least 7, said tile being further characterized in that the layers are bonded to each other by a plurality of metal fibers in said substrate layer having one end embedded in and bonded to the substrate layer and the other end embedded in and bonded to the surface layer.

2. The tile of claim 1 wherein said surface layer contains iron, copper, brass, lead or aluminum aggregate.

3. The tile of claim 1 wherein said inorganic aggregate of said surface layer is a mineral aggregate having a Mohs hardness of a least 7.

4. The tile of claim 3 wherein said mineral aggregate is an inorganic oxide.

5. The tile of claim 1 wherein said metal fibers in said substrate layer are steel fibers having a diameter of about 0.010 to 0.050 inch, a length of about 0.75 to 3.0 inch and an aspect ratio of at least 50.

6. The tile of claim 1 wherein said metal fibers are present in said substrate layer in an amount of about 8 to 16% by volume.

7. A heavy duty, wear, crack and spall-resistant concrete composite floor tile comprising:
 a concrete substrate layer containing about 4 to 16 volume percent of dispersed, fine, metal fibers, and
 a wear-resistant, concrete surface layer containing about 4 to 16 volume percent metal fibers,
 said tile being further characterized in that a plurality of said metal fibers have one end embedded in and bonded to said substrate layer and the other end embedded in and bonded to said surface layer and the amount of fibers present in said surface layer is greater than the amount of fibers present in said substrate layer.

8. The tile of claim 1 wherein said surface layer contains iron aggregate, said metal fibers present in said substrate layer are steel fibers having a diameter of about 0.010 to 0.050 inch, a length of about 0.75 to 3.0 inch, and an aspect ratio of at least 50, and said fibers are present in said substrate layer in an amount of about 8 to 16% by volume.

9. An industrial flooring comprising a horizontal array of heavy duty, wear, crack, and spall resistant concrete composite tiles, said floor tiles comprising:
 a concrete substrate layer containing 4 to 16 volume percent of dispersed, fine, metal fibers, and
 a wear-resistant concrete surface layer containing about 30 to 60 volume percent of a wear-resistant, metallic aggregate or an inorganic aggregate having a Mohs hardness of at least 7,
 said tile being further characterized in that the layers are bonded to each other by a plurality of metal fibers having one end embedded in and bonded to the substrate layer and the other end embedded in and bonded to the surface layer.

10. The flooring of claim 9 wherein said surface layer contains iron, copper, brass, or aluminum aggregate.

11. The flooring of claim 9 wherein said inorganic aggregate of said surface layer is a mineral aggregate having a Mohs hardness of at least 7.

12. The flooring of claim 11 wherein the mineral aggregate is an inorganic oxide.

13. The flooring of claim 9 wherein said metal fibers in said substrate layer are steel fibers having a diameter of about 0.010 to 0.050 inch, a length of about 0.75 to 3.0 inch, and an aspect ratio of at least 50.

14. The flooring of claim 13 wherein said metal fibers are present in said substrate layer in an amount of about 8 to 16% by volume.

15. An industrial flooring comprising a horizontal array of heavy duty, wear, crack and spall-resistant concrete composite tiles, said tiles comprising:
 a concrete substrate containing about 4 to 16 volume percent of dispersed, fine, metal fibers, and
 a wear-resistant, concrete surface layer containing about 4 to 16 volume percent metal fibers,
 said tile being further characterized in that said layers are bonded to each other by a plurality of metal fibers having one end embedded in and bonded to said substrated layer and the other end embedded in and bonded to said surface layer, and said fibers being present in said surface layer in an amount greater than the amount of said fibers in said substrate layer.

16. The flooring of claim 9 wherein said surface layer contains iron aggregate, said metal fibers present in said substrate layer are steel fibers having a diameter of about 0.010 to 0.050 inch, a length of about 0.75 to 3.0 inch, and an aspect ratio of at least 50, and said fibers are present in said substrate layer in an amount of about 8 to 16% by volume.

17. The tile of claim 7 wherein said metal fibers present in said surface layer are steel, copper, brass, lead or aluminum.

18. The flooring of claim 15 wherein said metal fibers present in said surface layer are steel, copper, brass, lead or aluminum.

* * * * *